United States Patent
Masputra et al.

(10) Patent No.: US 7,444,432 B2
(45) Date of Patent: Oct. 28, 2008

(54) SYSTEM AND METHOD FOR AN EFFICIENT TRANSPORT LAYER TRANSMIT INTERFACE

(75) Inventors: Cahya Adi Masputra, Millbrae, CA (US); Kacheong Poon, Milpitas, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 640 days.

(21) Appl. No.: 10/170,839

(22) Filed: Jun. 11, 2002

(65) Prior Publication Data

US 2004/0003147 A1 Jan. 1, 2004

(51) Int. Cl.
*G06F 15/16* (2006.01)

(52) U.S. Cl. ..................... 709/250; 709/227

(58) Field of Classification Search ............ 709/227, 709/236, 250; 710/52, 56
See application file for complete search history.

(56) References Cited

U.S. PATENT DOCUMENTS

| | | | | |
|---|---|---|---|---|
| 5,301,275 A | * | 4/1994 | Vanbuskirk et al. | 710/48 |
| 5,729,681 A | * | 3/1998 | Aditya et al. | 709/230 |
| 6,081,846 A | * | 6/2000 | Hyder et al. | 709/250 |
| 6,253,255 B1 | * | 6/2001 | Hyder et al. | 719/321 |
| 6,393,487 B2 | * | 5/2002 | Boucher et al. | 709/238 |
| 6,499,065 B2 | * | 12/2002 | Hyder et al. | 719/321 |
| 6,614,808 B1 | * | 9/2003 | Gopalakrishna | 370/469 |
| 6,981,051 B2 | * | 12/2005 | Eydelman et al. | 709/232 |
| 7,143,131 B1 | * | 11/2006 | Soles et al. | 709/203 |
| 7,174,393 B2 | * | 2/2007 | Boucher et al. | 709/250 |
| 7,281,030 B1 | * | 10/2007 | Davis | 709/212 |
| 7,349,391 B2 | * | 3/2008 | Ben-Dor et al. | 370/392 |

* cited by examiner

*Primary Examiner*—Douglas B Blair
(74) *Attorney, Agent, or Firm*—Martine Penilla & Gencarella LLP

(57) ABSTRACT

A kernel data transfer optimizing system for dynamically subdividing data blocks which are presented by application programs to be transferred to the kernel's network subsystem for processing into blocks of data in accordance with data transfer parameters set by the application program. The data transfer optimizing system includes logic that allows a programmer to dynamically adjust the size of data buffers that store the data blocks of the application program data in the kernel according to the application program parameters prior to transmitting the data blocks in the transport layer of the network subsystem. The data transfer optimizer allows the kernel to process data in large chunks thereby reducing the processing time of data presented to the network subsystem.

21 Claims, 9 Drawing Sheets

SYSTEM AND METHOD FOR AN EFFICIENT TRANSPORT LAYER TRANSMIT INTERFACE

CROSS REFERENCE TO RELATED APPLICATION

This is related to Poon et al., co-filed U.S. patent application Ser. No. 10/170,919 entitled "A System and Method for a Multi-data Network Layer Transmit Interface". To the extent not repeated herein, the contents of Poon et al., are incorporated herein by reference.

FIELD OF THE INVENTION

The present claimed invention relates generally to the field of computer operating systems. More particularly, embodiments of the present claimed invention relate to a system and method for an efficient transport layer transmit interface.

BACKGROUND ART

A computer system can be generally divided into four components: the hardware, the operating system, the application programs and the users. The hardware (e.g., central processing unit (CPU), memory and input/output (I/O) devices) provides the basic computing resources. The application programs (e.g., database systems, games business programs, etc.) define the ways in which these resources are used to solve the computing problems of the users. The operating system controls and coordinates the use of the hardware among the various application programs for the various users. In so doing, one goal of the operating system is to make the computer system convenient to use. A secondary goal is to efficiently make use the of hardware.

The Unix operating system is one example of an operating system that is currently used by many enterprise computer systems. Unix was designed to be a simple time-sharing system, with a hierarchical file system, which supports multiple processes. A process is the execution of a program and consists of a pattern of bytes that the CPU interprets as machine instructions or data.

Unix consists of two separable parts which include the "kernel" and the "system programs." Systems programs consist of system libraries, compilers, interpreters, shells and other such programs which provide useful functions to the user. The kernel is the central controlling program that provides basic system facilities. For example, the Unix kernel creates and manages processes, provides functions to access file-systems, and supplies communications facilities.

The Unix kernel is the only part of the Unix operating system that a user cannot replace. The kernel also provides the file system, CPU scheduling, memory management and other operating-system functions by responding to "system-calls." Conceptually, the kernel is situated between the hardware and the users. System calls are the means for the programmer to communicate with the kernel.

System calls are made by a "trap" to a specific location in the computer hardware (sometimes called an "interrupt" location or vector). Specific parameters are passed to the kernel on the stack and the kernel returns with a code in specific registers indicating whether the action required by the system call was completed successfully or not.

FIG. 1 is a block diagram illustration of a prior art computer system 100. The computer system 100 is connected to an external storage device 180 and to an external drive device 120 through which computer programs can be loaded into computer system 100. External storage device 180 and external drive 120 are connected to the computer system 100 through respective bus lines. Computer system 100 further includes main memory 130 and processor 110. Drive 120 can be a computer program product reader such a floppy disk drive, an optical scanner, a CD-ROM device, etc.

FIG. 1 additionally shows memory 130 including a kernel level memory 140. Memory 130 can be virtual memory which is mapped onto physical memory including RAM or a hard drive, for example. During process execution, a programmer programs data structures in the memory at the kernel level memory 140.

The kernel in FIG. 1 comprises a network subsystem. The network subsystem provides a framework within which many network architectures may co-exist. A network architecture comprises a set of network-communication protocols, the protocol from naming conventions for naming communication end-points, etc.

The kernel network subsystem 140 comprises three logic layers as illustrated in FIG. 2. These three layers manage the following tasks in the kernel; inter-process data transport; internetworking addressing; and message routing and transmission media support. The prior art kernel network subsystem 200 shown in FIG. 2 comprises a transport layer 220, a networking layer 230, and a link layer 240. The topmost layer in the network subsystem is the transport layer 220.

The transport layer 220 provides an addressing structure that permits communication between network sockets and any protocol mechanism necessary for socket sematics, such as reliable data delivery. The second layer is the network layer 230. The network layer 230 is responsible for the delivery of data destined for remote transport or network layer protocols. In providing internet work delivery, the network layer 230 manages a private routing database or utilizes system-wide facilities for routing messages to their destination host.

The lowest layer in the network subsystem is the network interface layer 240. The network interface layer 240 is responsible for transporting messages between hosts connected to a common transmission medium. The network interface layer 240 is mainly concerned with driving the transmission media involved and performing any necessary link-level protocol encapsulation and de-encapsulation.

FIG. 3A is a block diagram of a prior art Internet Protocol module for the network subsystem 200. The Internet protocol module in FIG. 3A provides a framework in which host machines connecting to the kernel are connected to the network with varying characteristics and the network interconnected with gateways. The Internet Protocol illustrated in FIG. 3A are designed for packet switching networks which provide reliable message delivery and notification of failure to pure datagram networks, such as the Ethernet that provides no indication of datagram delivery.

The IP layer 300 is the level responsible for host to host addressing and routing packet forwarding and packet fragmentation and re-assemble. Unlike the transport protocols, it does not always operate on behalf of a socket or the local links. It may forward packets, receive packets for which there are no local socket, or generate error packets in response. The function performed by the IP layer 300 are contained in the packet header. The packet header identifies source and destination hosts and the destination protocol.

The IP layer 300 processes data packets in one of four ways: 1) the packet is passed as input to a higher-level protocol; 2) the packet encounters an error which is reported back to the source; 3) the packet is dropped because of an error; or 4) the packet is forwarded along a path to its destination.

The IP layer 300 further processes any IP options in the header, checks packets by verifying that the packet is at least as long as an IP header, checksums the header and discards the packet if there is an error, verifies that the packet is at least as long as the header and checks whether the packet is for the targeted host. If the packet is fragmented, the IP layer 300 keeps it until all its fragments are received and reassembled or until it is too old to keep.

The major protocol of the Internet protocol suite is the TCP layer 310. The TCP layer 310 is a reliable connection oriented stream transport protocol on which most application protocols are based. It includes several features not found in the other transport and network protocols for explicit and acknowledged connection initiation and termination and includes reliable, in-order unduplicated delivery of data, flow control and out-of band indication of urgent data.

A TCP connection is a bi-directional, sequenced stream of data transferred between two peers. The data may typically be sent in packets of small sizes and at varying intervals; for example, when they are used to support a login session over the network. The stream initiation and termination are explicit events after the start and end of the stream, and they occupy positions in a separate space of the stream so that they can be acknowledged in the same manner as data is.

A TCP packet contains an acknowledgement and a window field as well as data, and a single packet may be sent if any of these three changes. A naïve TCP send might send more packets than necessary. For example, consider what happens when a user types one character to a remote-terminal connection that uses remote echo. The server side TCP receives a single-character packet. It might send an immediate acknowledgement of the character. Then milliseconds later, the login server would read the character, removing it from the receive buffer. The TCP might immediately send a window update notice that one additional octet of send window is available. After another millisecond or so, the login server would send an echo character of input.

All three responses (the acknowledgement, the window updates and the data returns) could be sent in a single packet. However, if the server were not echoing input data, the acknowledgement cannot be withheld for too long a time, or the client-side TCP would begin to retransmit.

In the network subsystem illustrated in FIGS. 1-3A, the network traffic exhibits a bi-modal distribution of packet sizes as shown in FIG. 3B. FIG. 3B shows an illustration of a sub-division of data presented to the network sub-system system 200 by applications programs. The data block 400 is typically sub-divided into small packets 410A-410C as the data is transferred between the network sub-system modules to the underlying network 250 (FIG. 3A).

In the kernel of the prior art computer systems depicted in FIGS. 1-3B, the underlying operating system of these computer systems have considerable performance problems in the bulk data transfer of data in the network subsystem. In fact, for many years there has been a common conception of formulating the network throughput to directly correlate to the host CPU speed, e.g., 1 megabit per second (Mbps) network throughput per 1 megahertz (MHz) of CPU speed. Although such a paradigm may be sufficient in the past for low bandwidth network environment, it may not be adequate for today's high-speed networking mediums, where bandwidths specified in units of gigabit per second (Gbps) are becoming increasingly common.

Network software overhead can be classified into per-byte and per-packet costs. Prior examinations of per-byte data movement cost in some prior art operating systems, such as SUN Solaris, networking stacks indicate that the overhead cost of small packet data size processing is as costly and significant as the per-byte costs.

These processing overhead costs affect the throughput in the transfer of bulk data through the network subsystem. The effect of the processing overhead cost in the prior art kernel network subsystem also affects the performance of the overall computer system.

SUMMARY OF INVENTION

Accordingly, to take advantage of the many legacy application programs available and the increasing number of new applications being developed and the requirement of these new applications for fast network bandwidth, a system is needed that optimizes data transmission through a kernel network subsystem. Further, a need exists for solutions to allow for the bulk transfer of data in a computer system to reduce the cost throughput of data associated with the transmission path in the kernel. A need further exists for an improved and less costly method of transmitting data without the inherent prior art problem of streaming data packets into small sizes.

What is described herein is a computer system having a kernel network subsystem that provides a system and a technique for providing bulk data transfer from applications to the network subsystem of the kernel without breaking down the data into small data packets. Embodiments of the present invention allow programmers to optimize data flow through the kernel's network subsystem on the main data path connection between the transport connection protocol and the Internet protocol suites of the kernel.

Embodiments of the present invention allow packet data sizes to be dynamically set in order to avoid a breakdown of application data into small sizes prior to being transmitted through the network subsystem. In one embodiment of the present invention, the computer system includes a transport layer transmit interface system of the kernel that includes optimization logic for enabling a programmer to write code to enable kernel modules to dynamically segment application data. This enables the bulk transfer of such data without the repetitive send and resend of small sized data of the prior art.

The transport layer transmit interface logic further provides a programmer with a number of semantics that may be applied to the data along with the manipulation interfaces that interact with the data. The transport layer transmit interface logic system of the present invention further allows the data segmentation to be implemented dynamically according to the data transfer parameters of the underlying kernel application program.

Embodiments of the present invention further include data flow optimizer logic to provide a dynamic sub-division of application data based on a specific parameter presented by the application data to the kernel's network subsystem. The data flow optimizer optimizes the main data path of application program segments through a network protocol module of the network sub-system and the transport layer module.

Embodiments of the present invention also include a data copy optimization module that provides a mechanism for enabling the data transmission optimizer of the present invention to copy data from a data generation module to the lower modules in the network subsystem.

Embodiments of the present invention further include a dynamic data buffer sizer. The dynamic data buffer sizer dynamically determines the size of the kernel buffer to suit a particular application data size parameter of the segment of data to be transmitted in the network sub-system. The data buffer sizer dynamically adjusts the size of data packets copied from the data generation module to the network and the transport layer module.

Embodiments of the present invention further include data optimization logic for the inter-transport layer module. The inter-module data optimizer optimizes the flow of segments of data between the modules in the network subsystem. The inter-module data optimizer ensures consistency in the copying of packets of data in each of the network sub-system modules.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments.

On the contrary, the invention is intended to cover alternatives, modifications and equivalents, which may be included within the spirit and scope of the invention as defined by the appended Claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

The embodiments of the invention are directed to a system, an architecture, subsystem and method to process data packets in a computer system that may be applicable to an operating system kernel. In accordance with an aspect of the invention, a data packet optimization system provides a programmer the ability to dynamically packetize the size of data for bulk data transmission in the transport layer of, the kernel from a computer application program over a computer network to a host network device.

Figure 4:
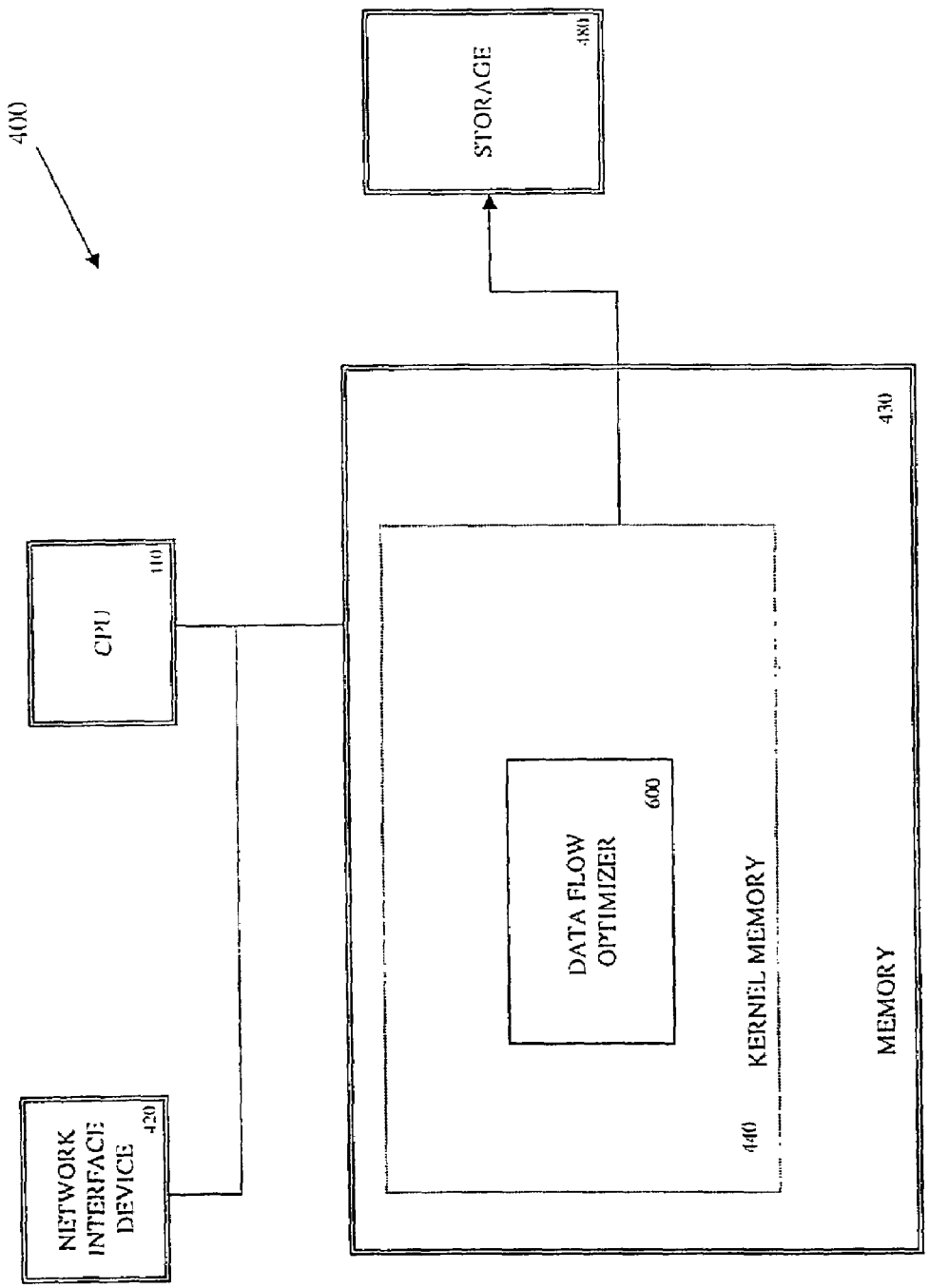
FIG. 4 is a block diagram of a computer system of one embodiment of the present invention.

FIG. 4 is a block diagram illustration of one embodiment of a computer system 400 of the present invention. The computer system 400 according to the present invention is connected to an external storage device 480 and to an external drive device 420 through which computer programs according to the present invention can be loaded into computer system 400. External storage device 480 and external drive 420 are connected to the computer system 400 through respective bus lines. Computer system 400 further includes main memory 430 and processor 410. Drive 420 can be a computer program product reader such a floppy disk drive, an optical scanner, a CD-ROM device, etc.

FIG. 4 additionally shows memory 430 including a kernel level memory 440. Memory 430 can be virtual memory which is mapped onto physical memory including RAM or a hard drive, for example, without limitation. During process execution, data structures may be programmed in the memory at the kernel level memory 440. According to the present invention, the kernel memory level includes a data flow optimizer 600. The data flow optimizer 600 enables a programmer to optimize data segments flow through the transport layer of the network subsystem of the kernel 440.

Figure 5:
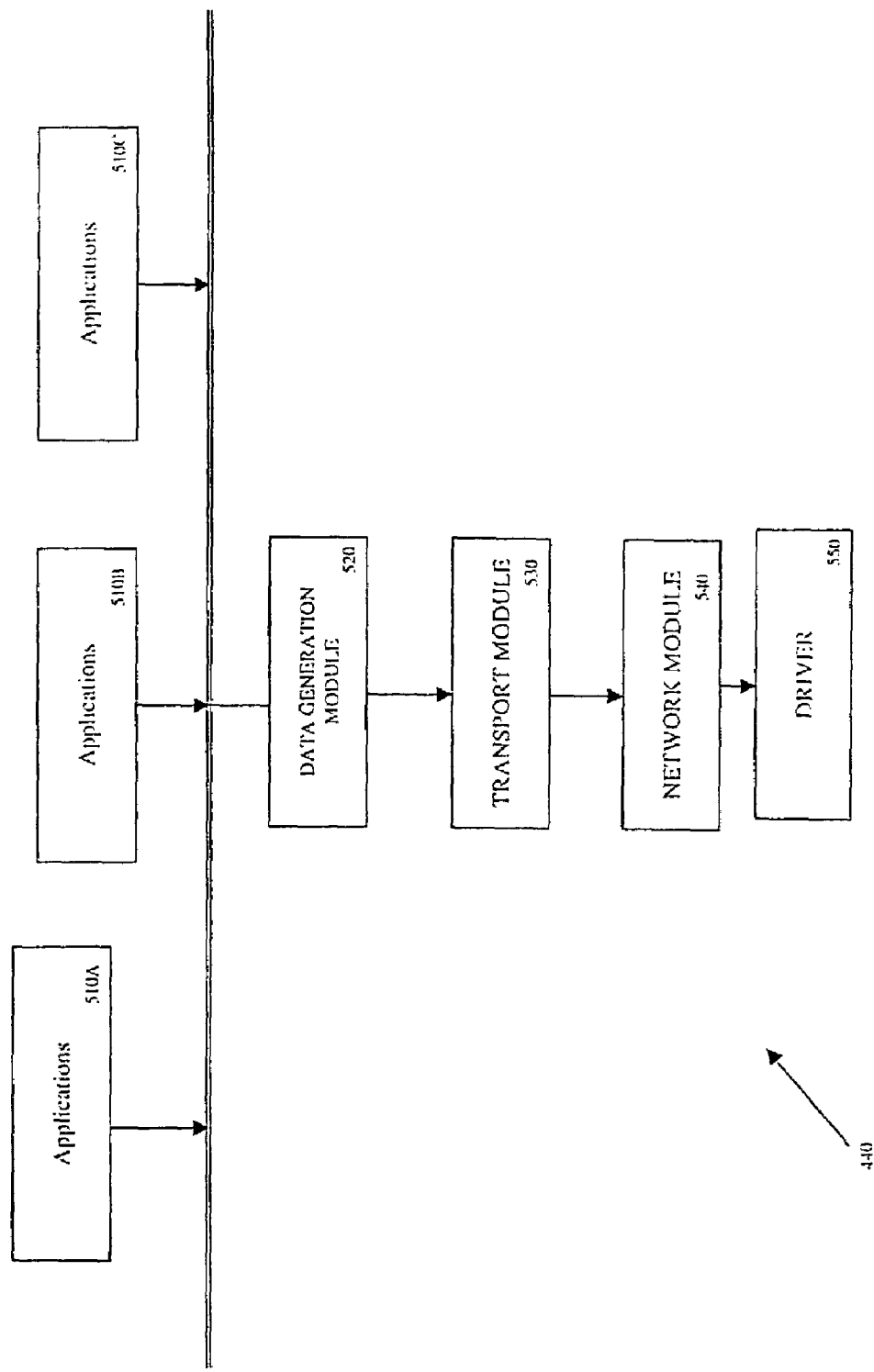
FIG. 5 is a block diagram of the efficient transport module of the kernel network subsystem of an embodiment of the present invention.

FIG. 5 is an exemplary block diagram illustration of one embodiment of the kernel memory space of the present invention. The exemplary kernel memory space comprises user applications 510A-510C, kernel data generation module 520, transport module 530, network module 540 and device driver module 550. The data generation module 520 provides the basic data configuration for the present invention. In one embodiment of the present invention, the data generation module 520 generates data using the STREAMS mechanism as is well known in the prior art. STREAMS are a feature of the UNIX operating system that provides a standard way of building and passing messages up and down a protocol stack. STREAMS pass messages from application programs "downstream" through the data generation module 520 to the network driver at the end of the stack. Messages are passed "upstream" from the driver to the applications program. The data generation module 520 is part of the data transport mechanism of the network sub-system. The data generation module 520 interfaces with the underlying transport module 530 and network module 540 respectively to transport data through the kernel structure.

The transport module 530 optimizes the performance of the main data path for an established connection for a particular application program. This optimization is achieved in part by the network module 540 knowledge of the transport module 530, which permits the network module 540 to deliver inbound data blocks to the correct transport instance and to compute checksums on behalf of the transport module 530. In addition, the transport module 530 includes logic that enables it to substantially reduce the number of acknowledgment overheads in each data block processed in the network sub-system.

The network module 540 is designed around its job as a packet forwarder. The main data path through the network module 540 is highly optimized for both inbound and outbound data blocks to acknowledge fully resolved addresses and to ports which the transport layer protocols have registered with the network module 540.

The network module 540 computes all checksums for inbound data blocks transmitted through the network subsystem. This includes not only the network header checksum, but also, in the data transport cases. In one embodiment of the present invention, the network module 540 knows enough about the transport module 530 headers to access the checksum fields in their headers. The transport module 530 initializes headers in such a way that the network module 540 can efficiently compute the checksums on their behalf. There are some performance efficiencies gained by the system in computing the checksum in only one place.

Figure 1:
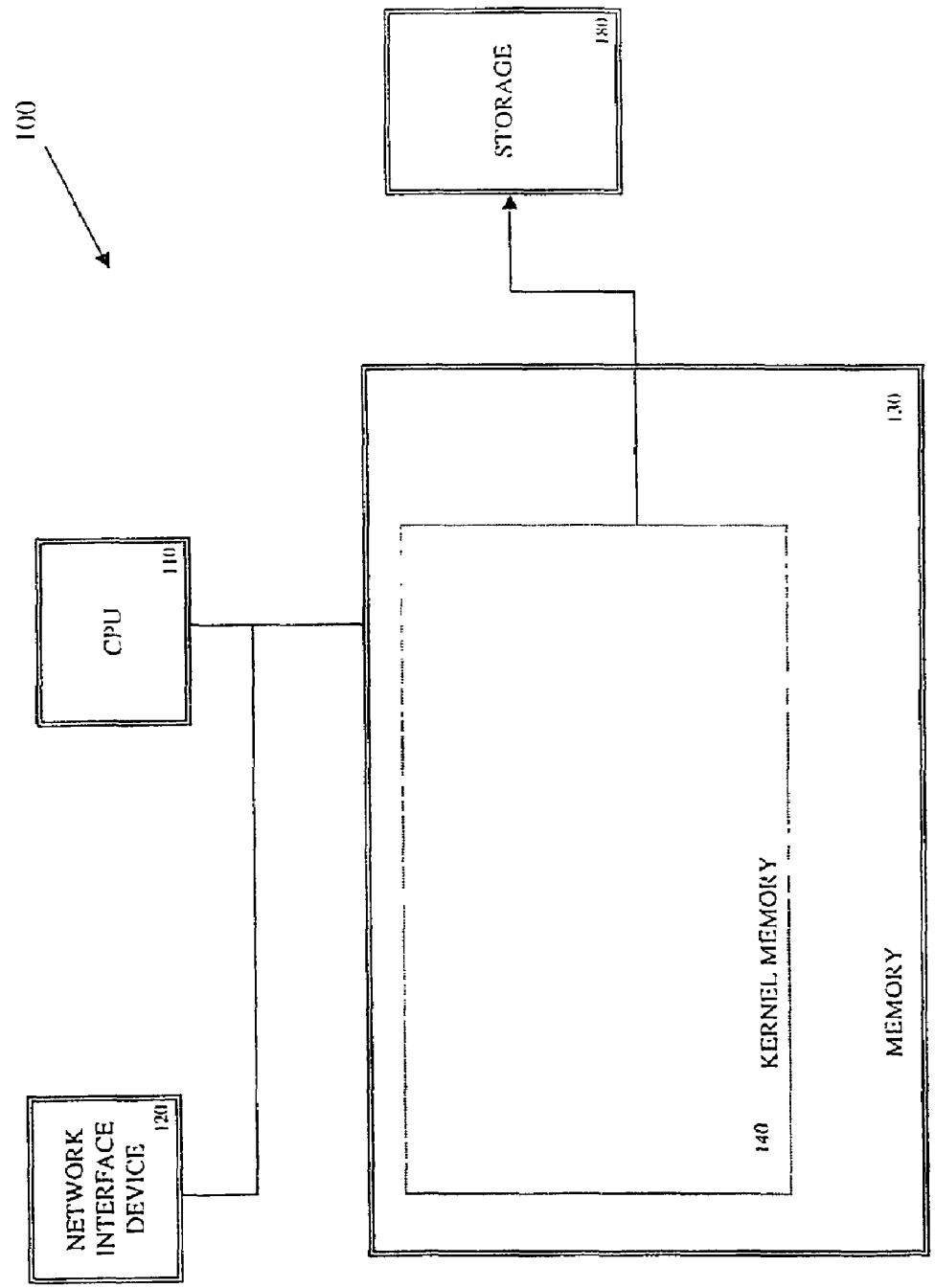
FIG. 1 is a block diagram of a prior art computer system.
Figure 2:
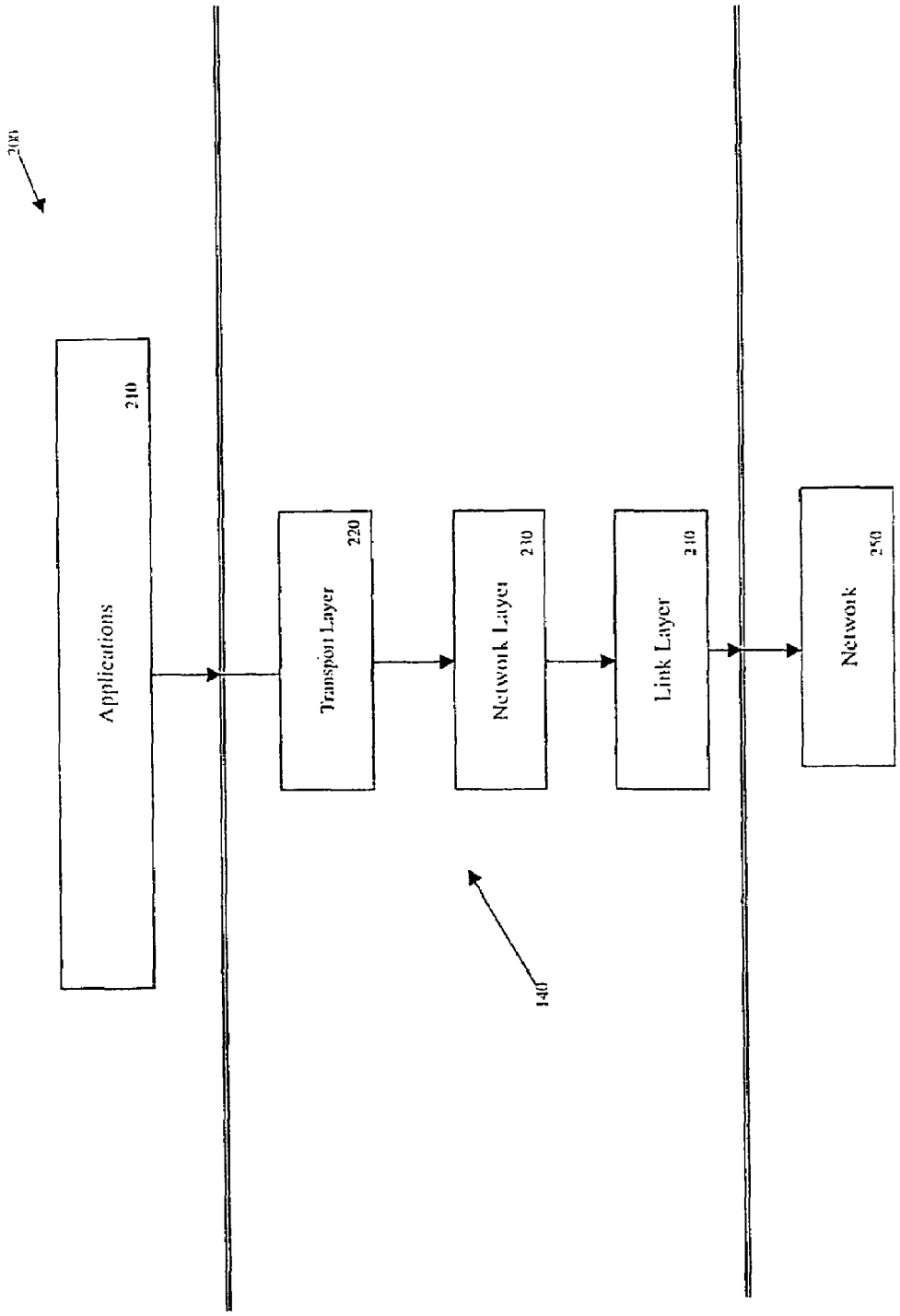
FIG. 2 is a block diagram of the software layers of a prior art kernel subsystem.
Figure 3A:
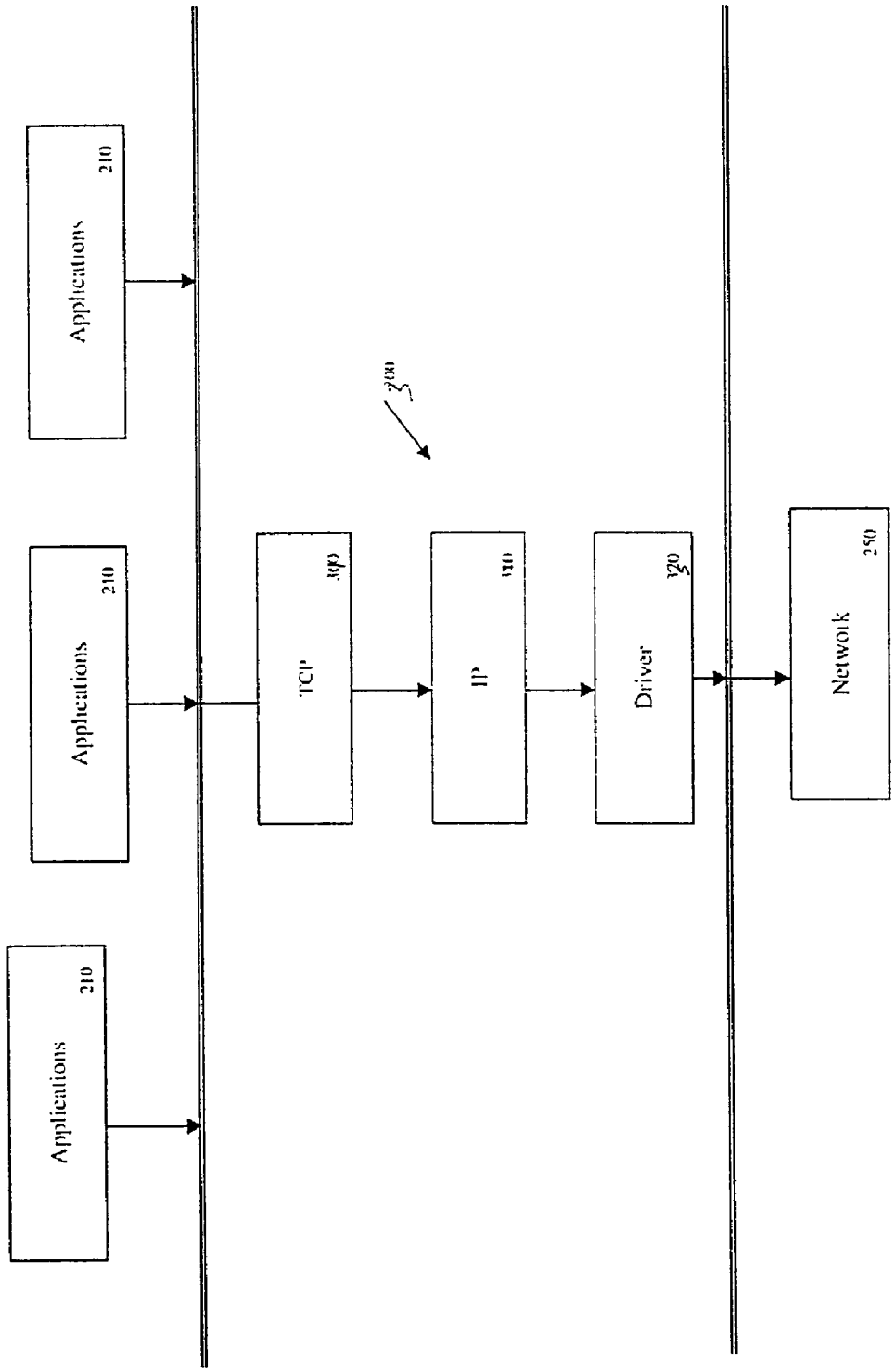
FIG. 3A is a block diagram of software layers of a network subsystem of a prior art kernel.
Figure 3B:
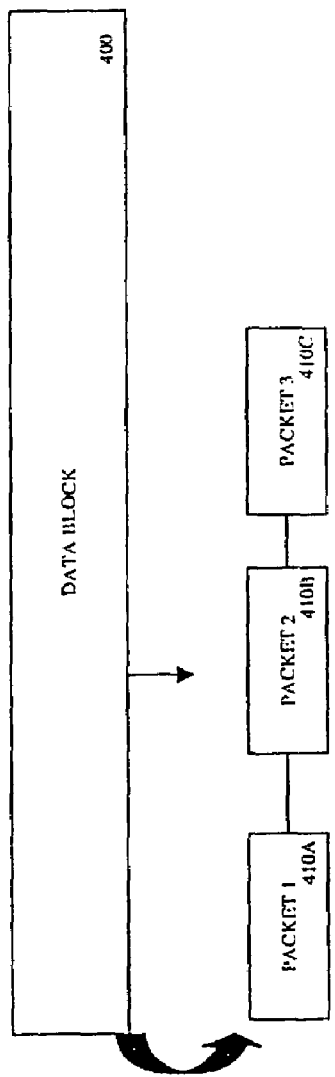
FIG. 3B is a block diagram illustration of a data segment of a prior art network subsystem.
Figure 6:
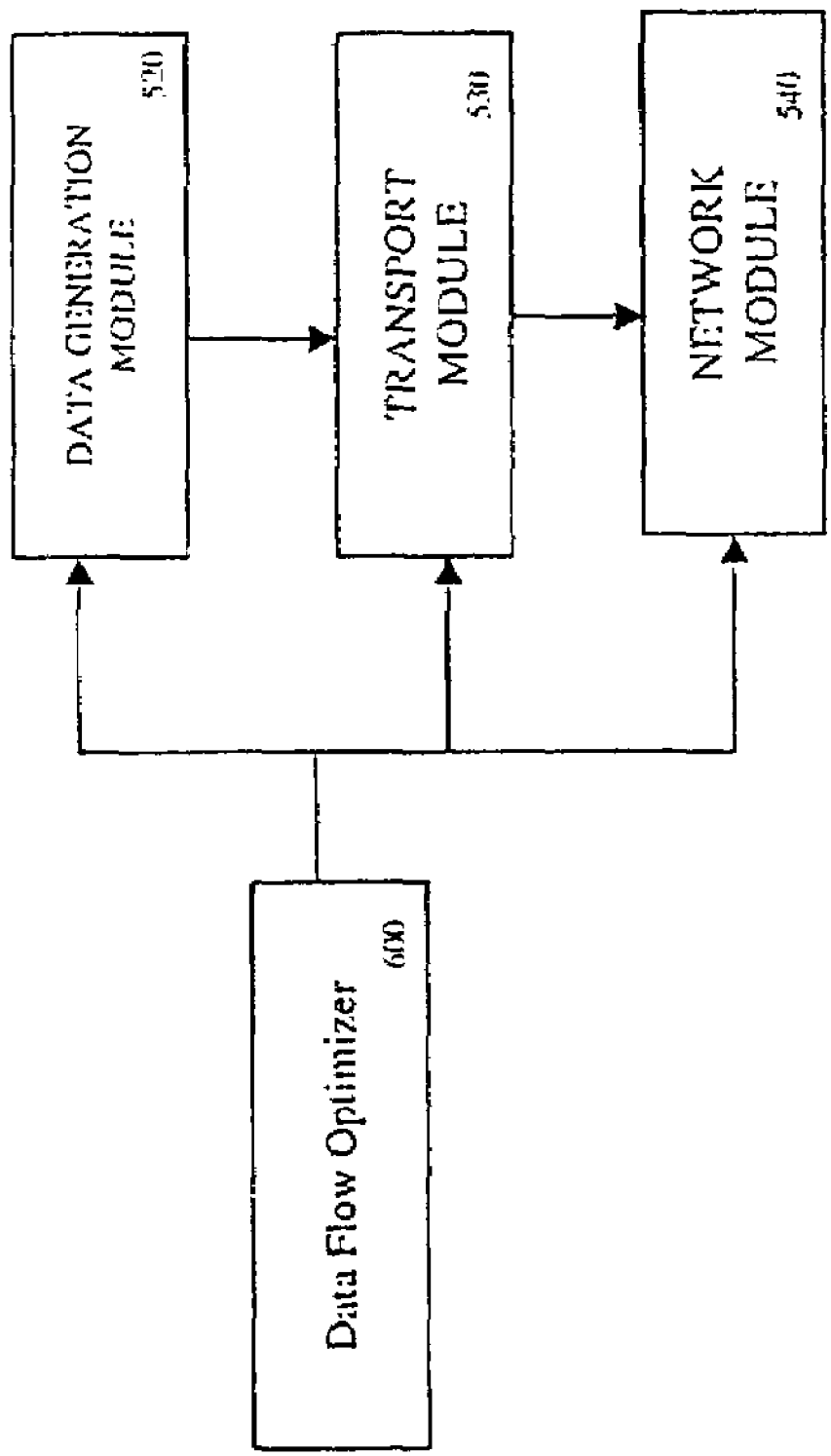
FIG. 6 is a block diagram of one embodiment of the efficient data stream optimizer of the kernel subsystem of an embodiment of the present invention.

FIG. 6 is a block diagram illustration of one embodiment of the data flow optimizer of the kernel network sub-system of the present invention. As shown in FIG. 3, the network subsystem comprises data generation module 520, transport module 530, network module 540 and the data flow optimizer 600.

The data flow optimizer 600 provides a mechanism for allowing the transfer of bulk data between the data generation module 520 and the transport module 530. The data flow optimizer 600 handles the numerous context switches, allocation overhead, etc., that are prevalent in the transport of bulk data between the network sub-system modules to reduce per-modular blocks inter module transport cost.

In one embodiment of the present invention, the data flow optimizer 600 reduces the inter-module transport cost of transmitting data from the upper layers of the network subsystem to the lower layers. The cost in reducing the transfer of data results in the optimal flow of data through the network sub-system. In another embodiment of the present invention, the data flow optimizer 600 dynamically sub-divides data presented to the network subsystem into blocks based on the data transfer parameters of the underlying kernel application program, rather than using the pre-determined packet size network transfers of the prior art.

Figure 7:
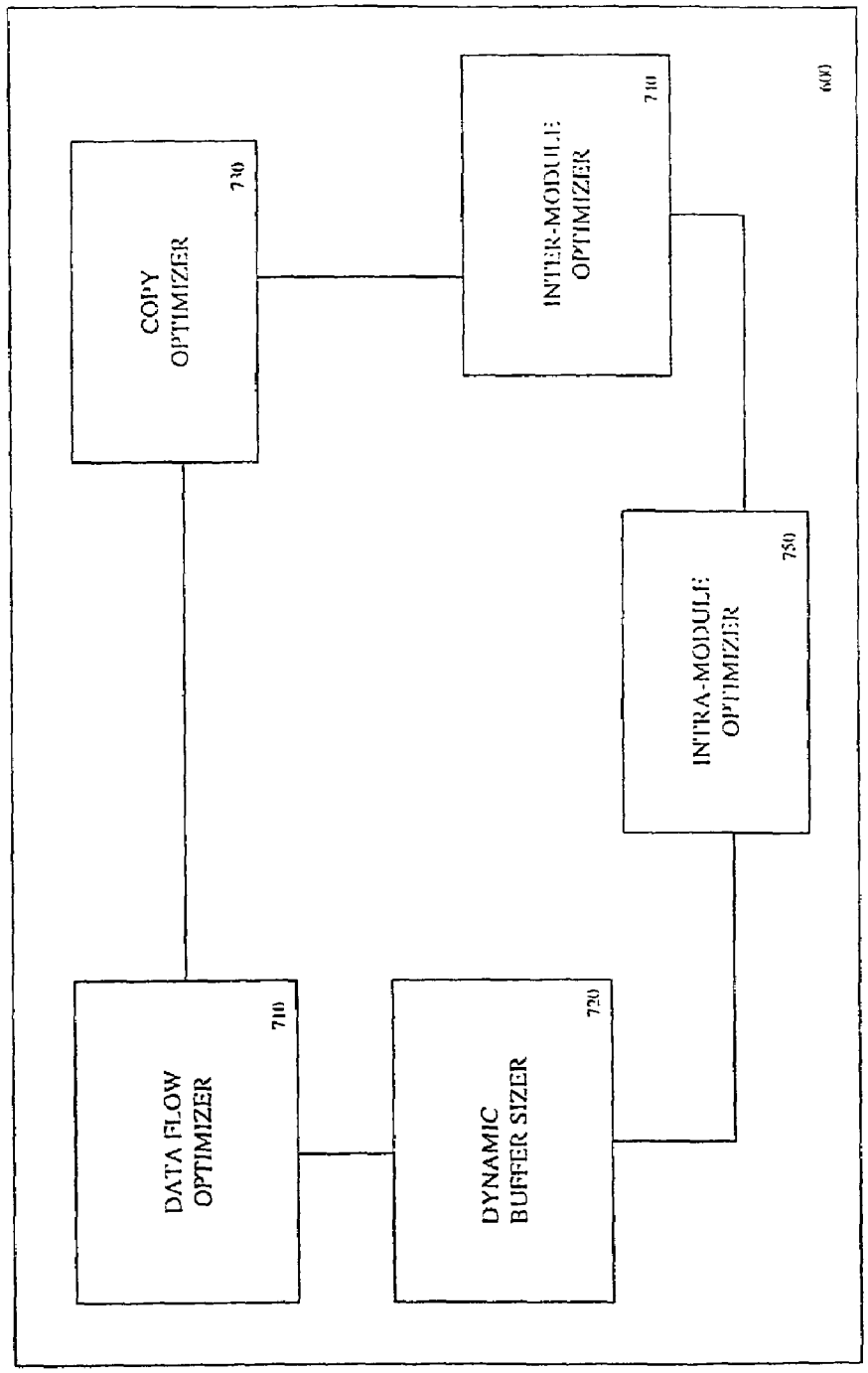
FIG. 7 is a block diagram of the internal architecture of one embodiment of the data flow optimizer of the present invention.

Reference is now made to FIG. 7 which is a block diagram illustration of one embodiment of the data flow optimizer 600 of the present invention. The data flow optimizer 600 comprises a data flow optimizing logic (DFOL) 710, a dynamic buffer sizer (DBS) 720, a data copy allocation optimizer (DCAO) 730, inter-module data transfer optimizer (IMDT) 740 and an intra-module data transfer optimizer (INDT) 750.

Figure 8:
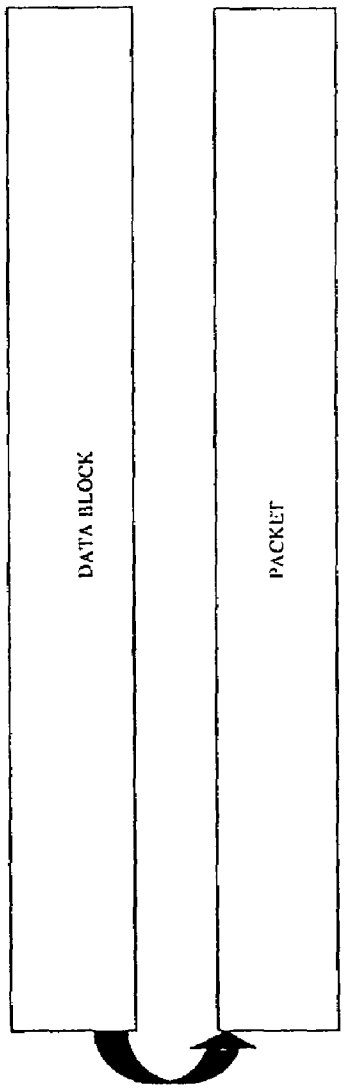
FIG. 8 is a block diagram of one embodiment of a segment of the data flow optimizer of the present invention.

DFOL 710 includes logic that provides the data flow optimizer 600 with a mechanism to optimize data transfer from the STREAM head module 520 through the data path in the IP module 540 and the TCP module. The DFOL 710 sub-divides data blocks presented by the STREAM head module 520 into data chunks large enough to reduce the repetitive send and resend of data packets in the prior art. Because large data blocks tend to have more context switches and allocation overheads which gets complicated when a large data block is transmitted in small packets, by transmitting data in large blocks as shown in FIG. 8, the DFOL 710 reduces the cost of transmitting data within the network subsystem and improves the utilization of the underlying network hardware.

The DFOL 710 also determines whether the underlying network device driver supports or has the capabilities to support a fast path transmission of large blocks of data as defined by the applications program of the present invention. In one embodiment of the present invention, if the underlying network hardware is incapable of handling the transfer of large data blocks, the DFOL 710 is able to revert to the legacy means of transferring data through the network subsystem in small packets. In another embodiment of the present invention, the DFOL 710 dynamically sets the data packet size based on the applications program communicating with the kernel's network subsystem.

The dynamic buffer sizer 720 sets the kernels network data buffers to store data streamed from the data generation module 520 to the other modules in the network subsystem. In one embodiment of the present invention, the dynamic buffer sizer 720 dynamically determines the size of incoming data blocks based on the parameters set by the application program, and sets the kernel buffers accordingly.

The IMDT 740 optimizes data flow between module in the kernel's network sub-system. In one embodiment of the present invention, the IMDT 740 checks each piece of data sent by the Stream head module to determine whether the data is to be transmitted in "fast path" mode for the upper modules to the lower modules. If a particular piece of data is set for fast path transmission, the data flow optimizer 600 implements the data segmentation mechanism to optimize the transfer of that particular piece of data from the data generation module 520 through the transport module 530 to the network module 540.

In one embodiment of the present invention, the IMDT 740 determines data block fast path qualification criteria based on the first packet transmitted in the data block. If the first packet is set as a fast path transfer, the entire data block is assumed to be set for fast path transfer.

Figure 9:
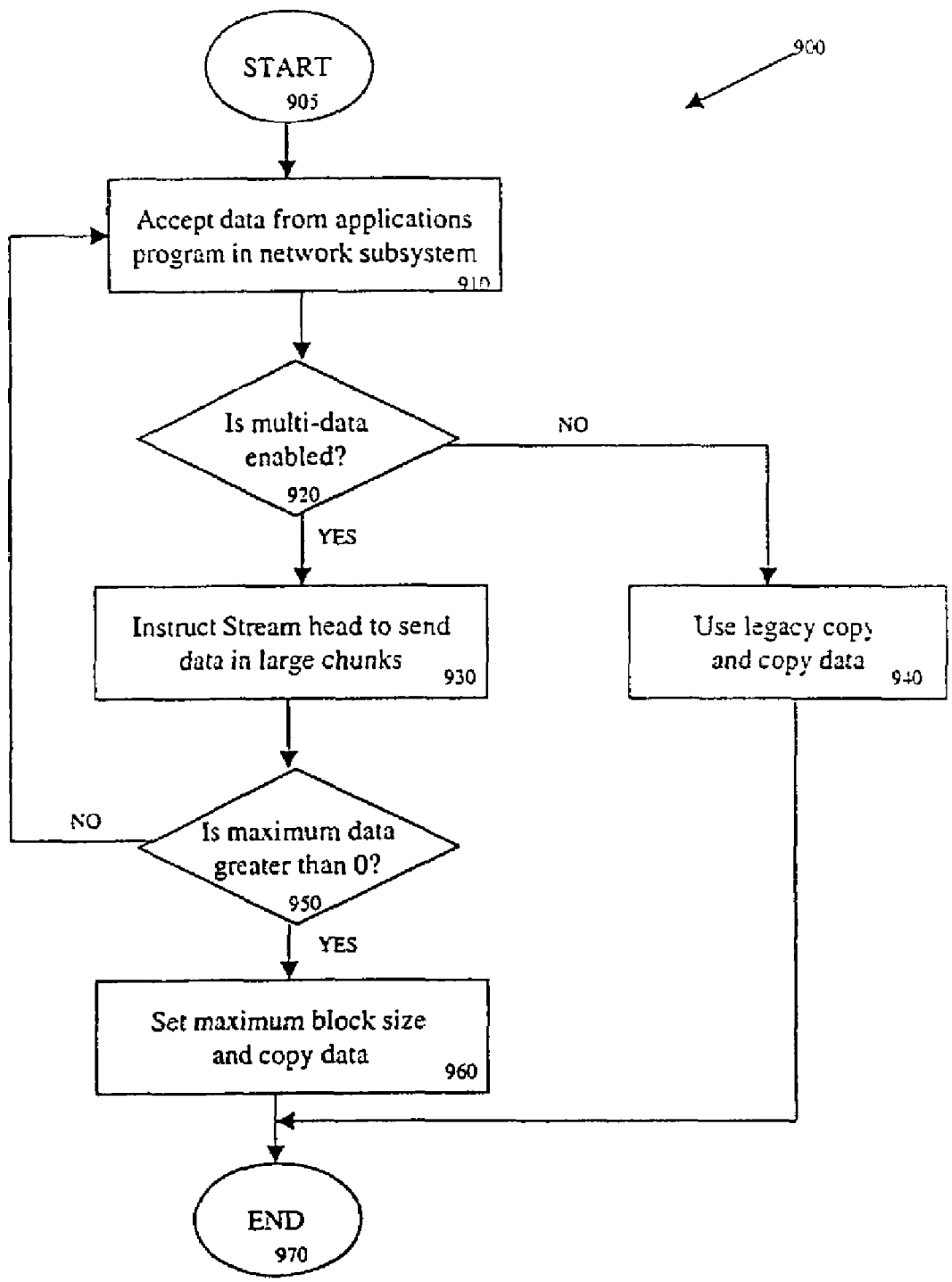
FIG. 9 is a flow diagram of a method of streaming data through the transport layer of the kernel subsystem of one embodiment of the present invention.

FIG. 9 is a computer implemented embodiment of the data flow optimizing method of the present invention. The network subsystem 500 receives data from application programs accessing the kernel at step 910. As data is received, the data flow optimizer checks to determine whether the respective application program has set its data transfer parameter to a multi-data transfer at step 920. Setting a data transfer parameter to multi-data transfer mode enables the data flow optimizer to initiate bulk data transfer of large chunks of data.

If the application data transfer parameter is set to a multi-data transfer mode, processing continues at step 930 where the data optimizer 600 processes the data in large chunks and transfers the data through the network subsystem 500 modules. If the data transfer parameter is not set for multi-data transfer mode, processing continues at step 940 where the data flow optimizer 600 uses the prior art legacy transfer of data in small packets.

At step 950, the data flow optimizer 600 checks the data block being transferred to determine if it has a maximum size greater than zero. If the data block size is greater than zero, the dynamic buffer 720 dynamically adjusts at step 960 to the size of data being transferred and the data flow optimizer processes the data and transmit the data block through the network subsystem 500 modules. If the maximum data size is less than zero, the data flow optimizer accepts new data from the kernel at step 910.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications are suited to the particular use contemplated. It is intended that the scope of the invention be defined by the Claims appended hereto and their equivalents.

The invention claimed is:

1. A computer system, comprising:
a processor;
a memory storage unit;
a network interface device; and
an operating system comprising a kernel, said kernel comprising a network sub-system comprising a data flow optimizer for optimizing data transport through a plurality of network transport modules in said network sub-system to said network interface device, said data flow optimizer comprises data flow optimizing logic for providing a dynamic sub-division of an application data based on a specific parameter presented by the application data to the network subsytem of the kernel, the dynamic sub-division of the application data determining a kernel buffer size to suit an application data segment size parameter of a data segment of the application to be transmitted in the network sub-system, the kernel buffer size not being fixed to pre-determined packet size, wherein the processor, the memory storage unit, the network interface device and the operating system of the computer system are communicatively connected as part of the computer system.

2. The computer system of claim 1, wherein said plurality of network transport modules comprises a data generation module.

3. The computer system of claim 2, wherein said plurality of network transport modules further comprises a transport module.

4. The computer system of claim 3, wherein said plurality of network transport modules further comprises a data optimized network module.

5. The computer system of claim 4, wherein said data flow optimizer further optimizes a main data path of data segments through the network module and the transport module of the network sub-system.

6. The computer system of claim 5, wherein said data flow optimizer further comprises a data copy optimization module tat provides a mechanism for enabling data to be copied from said data generation module to other modules in the network subsystem.

7. The computer system of claim 5, wherein said data flow optimizer further comprises a dynamic data buffer sizer for dynamically determining kernel buffer size.

8. The computer system of claim 7, wherein said data buffer sizer dynamically adjusts the size of data segments copied from the data generation module to the network module and the transport module.

9. The computer system of claim 5, wherein said data flow optimizer further comprises inter layer module data optimization logic for optimizing data flow between the plurality of network transport modules in the network subsystem, the inter module data optimization logic determining whether data is to be transmitted in a fast path mode.

10. The computer system of claim 9, wherein said inter module data optimizing logic determines whether data is to be transmitted in the fast path mode based on a first packet transmitted in a data block.

11. An optimized kernel network transport system within a kernel level memory of a main memory of a computer system, the optimized kernel network transport system including a plurality of modules which when executed by the computer system optimizes data transport trough a plurality of kernel network transport modules, the optimized kernel network transport system comprising:
a data flow optimizer for optimizing data transfer between modules in said network transport system;
a data transport module; and
a data network module, wherein said data flow optimizer comprises data flow optimizing logic for providing a dynamic sub-division of an application data based on a specific parameter presented by the application data to the network transport system of a kernel, the dynamic sub-division of the application data determining a kernel buffer size to suit an application data segment size parameter of a data segment of the application to be transmitted in the network transport system, the kernel buffer size not being fixed to pre-determined packet size.

12. The optimized kernel network transport system of claim 11, wherein said data flow optimizer further optimizes a main data path of data segments through the data network module of the network transport system and the data transport module.

13. The optimized kernel network transport system of claim 12, wherein said data flow optimizer further comprises a data copy optimization module that provides a mechanism for enabling data to be copied from upper layer modules of said network transport system to lower layer modules in the network transport system.

14. The optimized kernel network transport system of claim 13, wherein said data flow optimizer further comprises a dynamic data buffer sizer for dynamically determining the kernel buffer size.

15. The optimized kernel network transport system of claim 14, wherein said data buffer sizer dynamically adjusts based on a size of a data segment copied from the data network module to the data transport module and vice versa.

16. The optimized kernel network transport system of claim 15, wherein said data flow optimizer further comprises an inter module data optimization logic for optimizing data flow between modules in the network transport system, the inter module data optimization logic determining whether data is to be transmitted in a fast path mode.

17. The optimized kernel network transport system of claim 16, wherein said inter module data optimization logic determines whether data is to be transmitted in the fast path mode based on a first packet transmitted in a data block.

18. A data flow optimizing system within a kernel level memory of a main memory of a computer system, the data flow optimizing system including a plurality of modules which when executed by the computer provides optimized data transport through a plurality of kernel network modules, the data flow optimizing system comprising:
a data generation logic for processing data supplied to a kernel subsystem in a computer to a plurality of network devices coupled to said computer; and
a data flow optimizer comprising a plurality of data buffers for dynamically adjusting a size of data segments based on application data processed by said data generation logic for transmission through data processing modules in said kernel subsystem,
wherein data supplied to the kernel subsystem is segmented by said data flow optimizer according to data transfer parameters set by an application program for said plurality of network devices, the segmented data dynamically determining the kernel buffer size for transmitting the application data, the kernel buffer size not being fixed to pre-determined packet size.

19. A system as described in claim 18, wherein said data flow optimizer further compromises an entry indicating a number of valid data to be transferred between modules in said kernel subsystem.

20. A system as described in claim 18, wherein said data flow optimizing system is a kernel data structure of a computer operating system.

21. A system as described in claim 18, wherein said application program is aware of said plurality of data buffers.

* * * * *